Nov. 22, 1932.  T. V. BUCKWALTER  1,888,657
NUT LOCKING DEVICE
Filed June 1, 1931
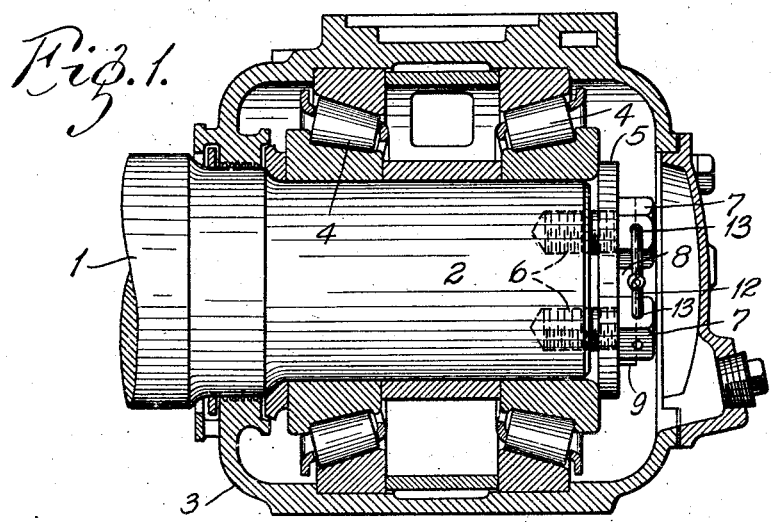
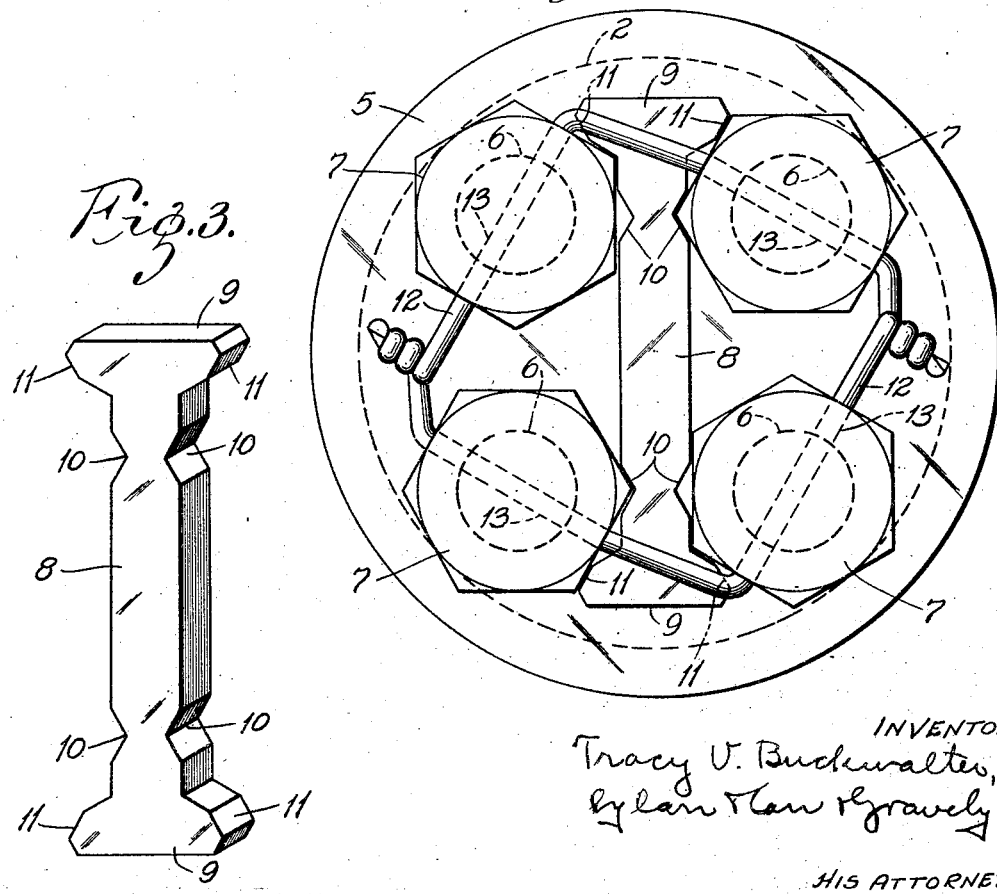
INVENTOR:
Tracy V. Buckwalter,
HIS ATTORNEYS Patented Nov. 22, 1932

1,888,657

UNITED STATES PATENT OFFICE

TRACY V. BUCKWALTER, OF CANTON, OHIO, ASSIGNOR TO THE TIMKEN ROLLER BEARING COMPANY, OF CANTON, OHIO, A CORPORATION OF OHIO

NUT LOCKING DEVICE

Application filed June 1, 1931. Serial No. 541,383.

My invention relates to nut locks, particularly to devices for locking a cluster of nuts or screw heads. The invention has for its principal object a construction that securely holds the nuts in position, that permits easy tightening or loosening of the nuts and that has a locking position for very closely spaced angular positions of said nuts.

The invention consists in the nut lock and in the parts, combinations and arrangements of parts hereinafter described and claimed.

In the accompanying drawing,

Fig. 1 is a sectional view of a railway car axle bearing whose securing plate at the end of the axle is held in position by screws whose heads are provided with a locking device embodying my invention, Fig. 2 is an end view of said plate, screws and locking device; and Fig. 3 is a perspective view of the locking device.

The drawing illustrates a railway car axle 1 whose reduced end portion 2 extends into a journal box 3, roller bearings 4 being interposed between said axle 1 and said journal box 3. Abutting against the end of the bearings 4 is a securing plate 5 that is held on the end of the axle by a cluster of four screws 6 having hexagonal heads 7.

My locking device is a metal strip 8 of substantially I-shape extending between the two screw heads 7 on one side of the cluster and the two screw heads 7 on the other side. The inner face of each end bar 9 or flange of the strip 8 is angularly disposed with respect to the body of the strip, the angle being such as to accommodate one corner of a screw head. In Fig. 2, the upper left hand screw head and the lower right hand screw head are each disposed with one corner in the angle between the inner face of the bar 9 and the body of the locking member 8.

Near each end, the locking member is provided with angular notches 10 in each side, said notches also being of an angularity to accommodate one corner of a screw head 7. In Fig. 2 the lower left hand screw head and the upper right hand screw head are each disposed with one corner in one of said notches. The outer end portions 11 of said end flanges 9 are beveled off to contact flatwise with one side of a screw head when said screw head is disposed with one corner in one of said notches 10.

In order to prevent the locking member from moving out endwise of the screws, a locking wire 12 is passed through the usual transverse bores 13 in the screw heads, said wire passing over the outer face of said locking member.

The above described nut lock is easy to install and position in a cluster of nuts or screw heads. When used in connection with hexagonal screws (or nuts), as shown, the device provides a locking position for each thirty degree angular movement of a screw head. The nuts or screws are held firmly in position, and at the same time, removal of the locking device for adjustment of the screws is easily accomplished.

What I claim is:

1. A locking device for nuts, screw heads and the like, comprising a strip having a projecting flange whose inner face makes an angle with the body of the strip to accommodate one corner of a nut, said strip also having near the end thereof a notch in its body for accommodating a corner of a nut.

2. A locking device for a cluster of nuts, screw heads and the like comprising a strip of generally I-section, the inner faces of the projecting bars at the ends of said strip each forming with the body of said strip an angle for receiving one corner of a nut.

3. A locking device for a cluster of nuts, screw heads and the like comprising a strip of generally I-section said strip being provided with notches near its ends each adapted to receive one corner of a nut.

4. A locking device for a cluster of nuts comprising a strip of generally I-section extending through said cluster, between pairs of nuts the inner faces of the projecting bars at the ends of said strip each forming with the body of said strip an angle for receiving one corner of a nut and means for preventing movement of said locking device endwise of said nuts.

5. A locking device for a cluster of nuts comprising a strip of generally I-section adapted to extend through said cluster, the inner faces of the projecting bars at the ends of said strip each forming with the body of said strip an angle for receiving one corner of a nut, said strip also being provided near each end with notches in its body for receiving one corner of a nut.

6. A locking device for a cluster of nuts comprising a strip of generally I-section adapted to extend through said cluster, the inner faces of the projecting bars at the ends of said strip each forming with the body of said strip an angle for receiving one corner of a nut, said strip also being provided near each end with notches in its body for receiving one corner of a nut, and the outer end portion of each bar being beveled to engage one side of a nut having a corner in one of said notches.

Signed at Canton, Ohio, this 25 day of May 1931.

TRACY V. BUCKWALTER.